(12) United States Patent
Mandal et al.

(10) Patent No.: US 11,962,562 B2
(45) Date of Patent: Apr. 16, 2024

(54) ANONYMOUS MESSAGE BOARD SERVER VERIFICATION

(71) Applicant: FUJITSU LIMITED, Kawasaki (JP)

(72) Inventors: Avradip Mandal, Kirkwood, CA (US); Hart Montgomery, San Francisco, CA (US); Jaspal Singh, Sunnyvale, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/880,059

(22) Filed: Aug. 3, 2022

(65) Prior Publication Data

US 2024/0048519 A1    Feb. 8, 2024

(51) Int. Cl.
*H04L 51/48* (2022.01)

(52) U.S. Cl.
CPC .................................. *H04L 51/48* (2022.05)

(58) Field of Classification Search
CPC ....................................................... H04L 51/48
See application file for complete search history.

(56) References Cited

U.S. PATENT DOCUMENTS 9,462,070 B2 * 10/2016 Kawa ...................... H04L 67/54

OTHER PUBLICATIONS

Corrigan-Gibbs et al., "Riposte: An Anonymous Messaging System Handling Millions of Users" May 17, 2015.
Sampigethaya, "A Survey on Mix Networks and Their Secure Applications" Dec. 12, 2006.
Dingledine, "Tor: The Second-Generation Onion Router" Aug. 9, 2004.
U.S. Appl. No. 17/398,704, filed Aug. 10, 2021.

* cited by examiner

*Primary Examiner* — Joe Chacko
(74) *Attorney, Agent, or Firm* — Maschoff Brennan (57) ABSTRACT

According to an aspect of an embodiment operations may include receiving, by a server, message shares. The operations may also include generating, by the server, an aggregate hash share of the message shares. In addition, the operations may include receiving, by the server, a verification vector iteration from another server and generating another verification vector iteration based on: the received verification vector iteration, a permutation that corresponds to the server, and a masking vector that corresponds to the server. The operations may also include obtaining a verification hash that is based on the verification vector and participating in a multiparty computation to determine an aggregate hash. The operations may also include determining, as part of the multiparty computation, whether one or more of the servers is operating in an adverse manner based on whether the verification hash is equal to the aggregate hash.

20 Claims, 4 Drawing Sheets

ANONYMOUS MESSAGE BOARD SERVER VERIFICATION

BACKGROUND

Anonymous message boards may facilitate postings of information such as messages, hashes, encryptions, proofs of settlement, transactions, and the like, which may be referred to generally herein as "messages." Anonymous message boards may allow the messages to be posted to the message board in a manner that may not allow an observer to trace the message back to the poster.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment operations may include receiving, by a server, message shares in which each respective message share corresponds to a portion of a message provided by a respective client device of a plurality of client devices. The operations may also include generating, by the server, an aggregate hash share of the message shares. In addition, the operations may include receiving, by the server, a verification vector iteration from another server and generating another verification vector iteration based on: the received verification vector iteration, a permutation that corresponds to the server and that indicates a particular arrangement order of elements of a set, and a masking vector that corresponds to the server. The operations may also include obtaining a verification hash that is based on the verification vector and participating, with one or more of the other servers, in a multiparty computation to determine an aggregate hash, the aggregate hash being determined based on the aggregate hash share. The operations may also include determining, as part of the multiparty computation, whether one or more of the servers is operating in an adverse manner based on whether the verification hash is equal to the aggregate hash.

The object and advantages of the embodiments will be realized and achieved at least by the elements, features, and combinations particularly pointed out in the claims.

It is to be understood that both the foregoing general description and the following detailed description are exemplary and explanatory and are not restrictive of the claims.

BRIEF DESCRIPTION OF THE DRAWINGS

Example embodiments will be described and explained with additional specificity and detail through the use of the accompanying drawings.

DESCRIPTION OF EMBODIMENTS

Highly sensitive information that is communicated on related messaging systems may be susceptible to traffic analysis attacks. For instance, monitoring of information passed through and posted on financial trading systems related to financial transactions (e.g., specific trades being made, types of trades, etc.) may allow for observers to predict and adapt to corresponding market changes. As another example, a whistleblower may wish to expose some activity of an entity in a manner that is not traceable to the whistleblower because the whistleblower may risk sever retaliation if identified. However, an analysis of traffic on a system used by the whistleblower to expose such information may allow for identification of the whistleblower.

In the present disclosure, any suitable electronic system that may be used to post information may be referred to as a "message board." Further, any suitable information that is provided to the message board for posting may be generally referred to as "messages." Examples of the messages may include transactions, settlements of transactions, proofs of settlement, hashes, encryptions, etc.

In some instances, anonymous message boards may be used to help preserve the integrity of message posting and inhibit nefarious analysis of the messages, such as traffic analysis attacks. For example, anonymous message boards may be employed for numerous applications where privacy may be desired or required by law. For instance, private financial transactions and settlements, whistleblowing disclosures, medical record updates, anonymous auctions, anonymous voting, and the like may benefit from an anonymous message board.

In some embodiments, an anonymous message board may be managed in a distributed manner by a set of servers to help ensure the integrity of the anonymous message board. However, to help maintain the integrity of the anonymous message board, it may be helpful to be able to identify servers that are operating in an adverse manner (e.g., malicious manner). A server operating in an adverse or malicious manner may include modifying information to be posted and/or that is posted. Further, a server operating in a malicious manner may include accessing or attempting to access information for which the server may not be authorized to access. Further, the anonymous message board may be set up to avoid any one server having complete access to the messages associated with the anonymous message board.

According to one or more embodiments of the present disclosure, an anonymous message board may be implemented using multi-party computation techniques in a manner that may identify suspect servers while also maintaining the confidentiality of the messages of the anonymous message board. Further, the procedures disclosed herein may be such that threshold homomorphic encryption procedures and use of associated zero-knowledge proofs may be reduced. The reduction of such procedures and proofs may allow for improved speed and efficiency in maintaining the integrity of anonymous message boards.

Figure 1:
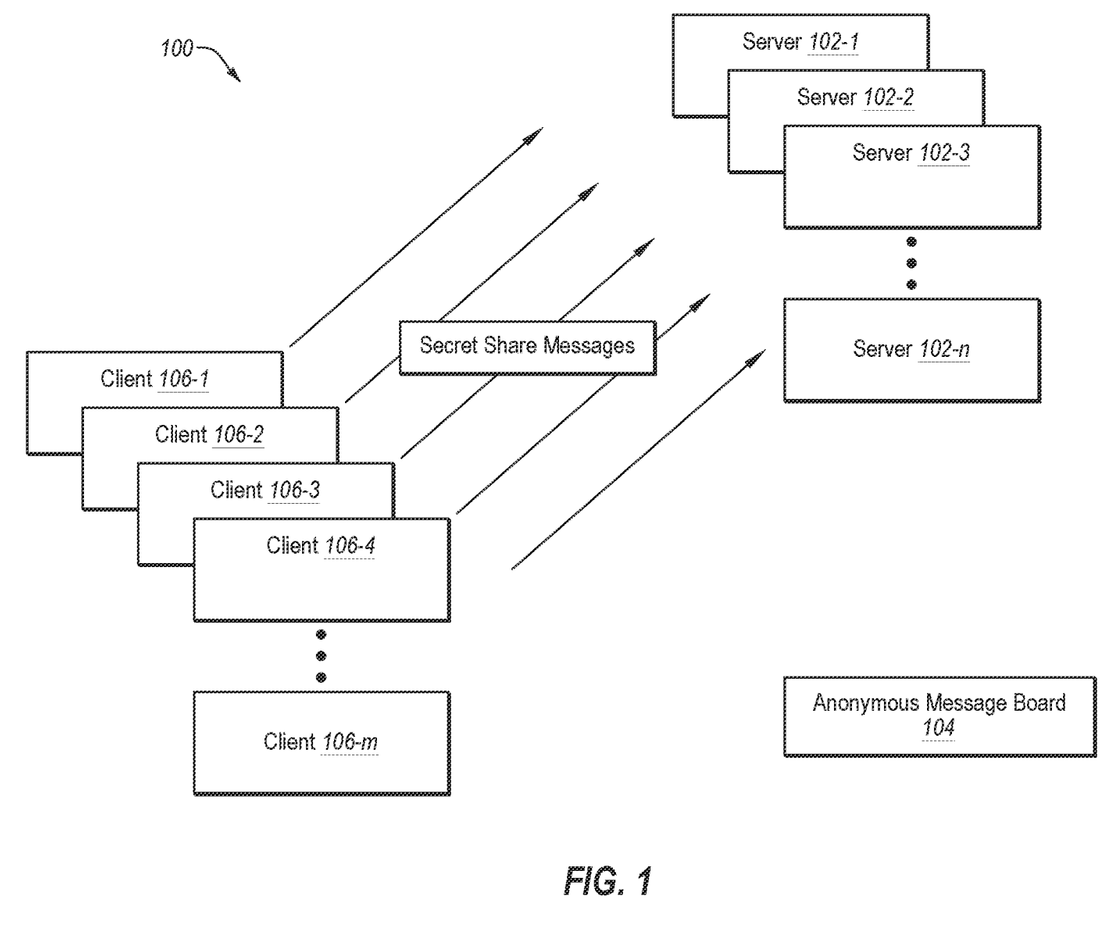
FIG. 1 illustrates an example system configured to perform server verification of servers that manage an anonymous message board.

FIG. 1 illustrates an example system 100 configured to perform server verification of servers that manage an anonymous message board. The system 100 may be arranged according to one or more embodiments of the present disclosure.

The system 100 may include n number of servers 102 (102-1, 102-2, 102-3, . . . 102-n). In general, each server 102 may be any suitable system, apparatus, or device configured to perform the corresponding operations described herein.

Additionally or alternatively, the servers 102 may include one or more processor-based computing systems. For example, the servers 102 may include one or more hardware servers or other processor-based computing devices configured to function as a server. The servers 102 may include a memory and network communication capabilities. In some embodiments, the servers 102 may each include a computing system such as described below with respect to FIG. 4. Additionally or alternatively, in some embodiments, the servers 102 may include one or more modules configured to perform and/or direct the operations described with respect to the servers 102. The modules in some embodiments may include code and routines configured to enable a corresponding server 102 to perform one or more operations. Additionally or alternatively, the modules may be implemented using hardware including a processor, a microprocessor (e.g., to perform or control performance of one or more operations), a field-programmable gate array (FPGA), or an application-specific integrated circuit (ASIC). In some other instances, the modules may be implemented using a combination of hardware and software.

In these or other embodiments, the system 100 may include multiple clients 106. The clients 106 may include any suitable system, apparatus, or device configured to provide messages to the servers 102 for posting on an anonymous message board (AMB) 104. Some examples of the clients 106 may include a mobile phone, a smartphone, a tablet computer, a laptop computer, a desktop computer, a set-top box, a virtual-reality device, or a connected device, etc. The clients 106 and the servers 102 may be communicatively coupled via any suitable network.

The servers 102 may be configured to manage the AMB 104 of the messages that may be posted by clients 106. In general, each server 102-$i$ (where i is from 1 to n) may receive a respective message share $b_{i,j}$ from a client 106-$j$ (where j is from 1 to m) of the clients 106. Each message share $b_{i,j}$ may be a portion of a corresponding message that the client i is posting on the AMB 104. The message shares $b_{i,j}$ may be distributed and configured according to any applicable multi-party secret share scheme in which a corresponding message $b_j$, may only be reconstructed using a threshold number of message shares $b_{i,j}$. Therefore, in order for the corresponding message $b_j$, to be reconstructed for posting on the AMB 104, a threshold number of servers 102 may need to perform a multi-party computation using their respectively received message shares $b_{i,j}$.

In these and other embodiments, the system 100 may be configured such that m number of messages $b_j$, may be reconstructed and posted at the same time to help prevent analysis attacks by inhibiting determinations such as which clients sent which messages. For example, in response to collectively receiving m number of messages $b_j$ (in the form of corresponding message shares $b_{i,j}$) from m number of clients 106 (e.g., clients 106-1, 106-2, 106-3, 106-4, 106-5, . . . 106-$m$) the servers 102 may reconstruct and post the messages $b_j$ to the AMB 104. In some embodiments, the posted messages may be encrypted or decrypted. The number of messages m that may be collected before reconstructing and posting the messages may vary. In general, the number may be based on having enough messages to make it difficult to piece together any information as to which client 106-$j$ provided which message $b_j$. In general, as the number m gets larger, the more difficult it is to glean information from the posted messages. However, as the number m gets larger the amount of delay in posting messages and the amount of processing required to perform a server verification process, such as described in further detail below, may also increase. Therefore, the actual value of m may vary depending on security and/or processing requirements associated with the AMB 104.

In these and other embodiments, for each interval of receiving m messages $b_j$ the servers 102 may perform a server verification process. The server verification process may help ensure that one or more servers are not operating in a malicious manner regarding the messages that are posted on the AMB 104. For example, the server verification process may help ensure that one or more servers are not able to operate in a malicious manner such as, individually or collectively, identifying which clients 106 sent which messages $b_i$, changing the contents of one or more of the messages $b_i$, viewing the contents of one or more of the messages $b_i$, etc. In some embodiments, the server verification process may be performed as outlined in detail with respect to a process 200 described with respect to FIG. 2.

Modifications, additions, or omissions may be made to FIG. 1 without departing from the scope of the present disclosure. For example, the number of servers 102 and/or clients 106 may vary.

Figure 2:
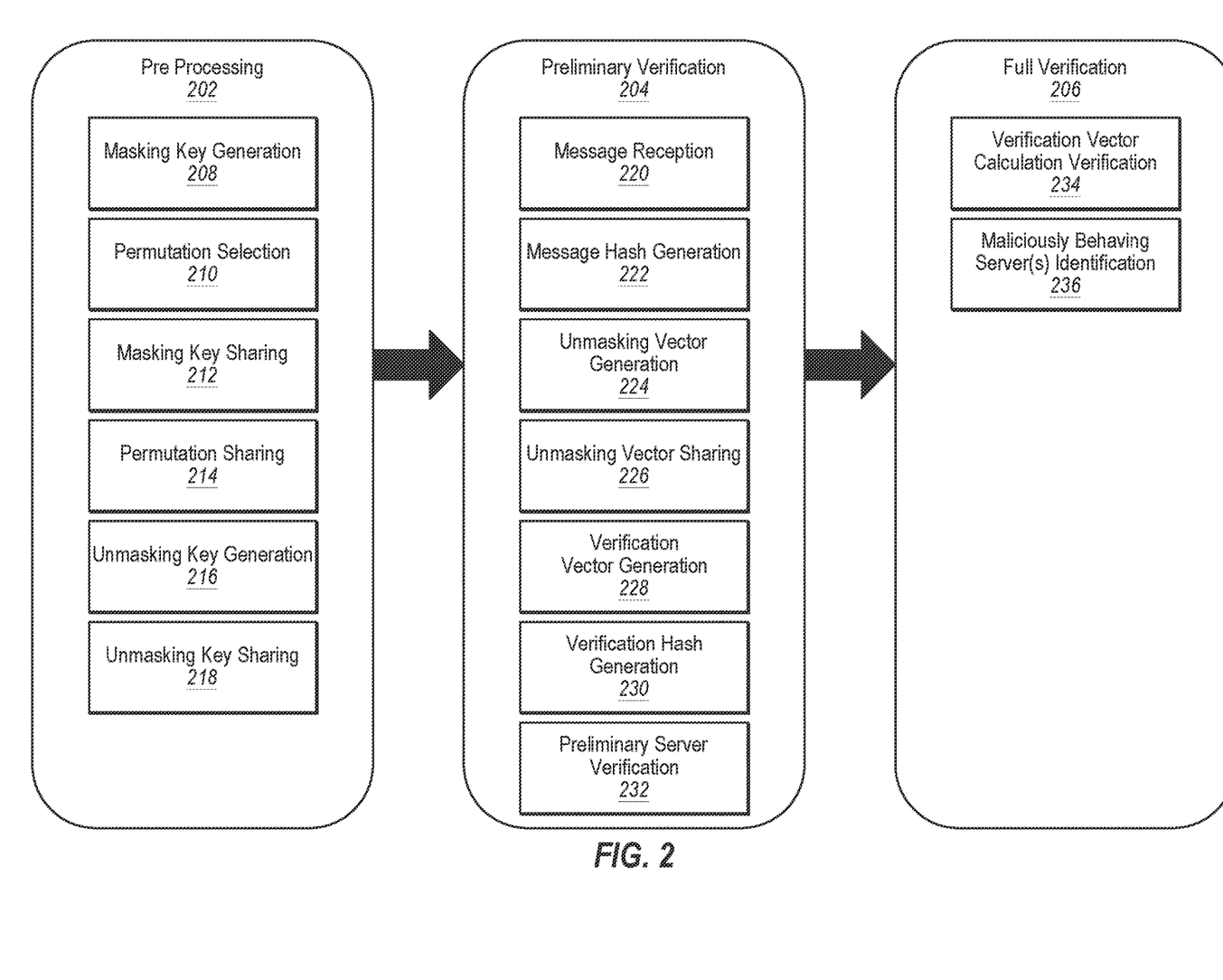
FIG. 2 illustrates a process that includes example operations that may be performed to verify servers that manage an anonymous message board.

FIG. 2 illustrates the process 200, which includes example operations that may be performed to verify servers (e.g., the servers 102 of FIG. 1) that manage an AMB (e.g., the AMB 104 of FIG. 1). The process 200 may include a pre-processing phase 202, a round-robin verification phase 204, and a full verification phase 206. The operations of the process 200 may be performed by one or more of the servers 102 of FIG. 1 in some embodiments.

In general, the pre-processing phase 202 may establish parameters that may be used in the preliminary verification phase 204 and/or the full verification phase 206. For example, as detailed below, the preliminary verification phase 204 may perform verification using a permutation based multi-party computation scheme. The pre-processing phase 202 is used to establish the parameters that may be used in such a scheme. The process 200 is described in relation to the elements of the system 100 of FIG. 1 for ease of explanation.

For example, as part of the preliminary verification phase 204, each of the servers 102-$i$ (where i is from 1 to n) may use a corresponding masking key $u_i$, as described in further detail below. As discussed in further detail below, the masking keys $u_i$ may be used to mask content related to each message $b_j$ (where j is from 1 to m) received from m different clients 106. As such, in some embodiments, each masking key $u_i$, may be an m-element long vector of m different masking values in which each masking value may be a random l length bit string.

In some embodiments, the pre-processing phase 202 may accordingly include masking key generation 208. During the masking key generation 208, each of the servers 102-$i$ may generate a corresponding masking key $u_i$. In some embodiments, generation of the masking keys $u_i$ may include selecting a random vector from a set of vectors $L^m$ where $L=\{0,1\}^l$ to obtain the vector of m different l length bit string masking values to use as the respective masking keys $u_i$.

In these or other embodiments, the pre-processing phase 202 may include masking key sharing 212. During the masking key sharing 212, each server 102-$i$ may secret share its corresponding masking key $u_i$ with the other servers 102. For example, each other server 102 may be provided with a different masking key share of the respective masking key $u_i$. In some embodiments, the secret sharing may be based on any applicable secret sharing scheme.

In these or other embodiments, the masking key sharing 212 may include each server 102-$n$ publicly posting a commitment for its respective masking key $u_i$. A posting of a "commitment" may include using any suitable commitment scheme that allows an entity to commit to a chosen value (or chosen statement) while keeping it hidden to others, with the ability to reveal the committed value later. Commitment schemes are generally designed prevent or inhibit the changing of the value after such a value has been committed to. As such, the posting of the masking key commitments may prevent one of the servers 102-$i$ from operating in a malicious manner through changing its respective masking key $u_i$ while also helping maintain confidentiality of its respective masking key $u_i$. In some embodiments, the masking value commitments may be posted using a public message board.

Additionally, as part of the preliminary verification phase 204, each of the servers 102-$i$ may use a corresponding permutation $p_i$, as described in further detail below. As discussed in further detail below, the permutations $p_i$ may be used to shuffle the order of the messages $b_j$ received from m different clients 106. As such, in some embodiments, each permutation $p_i$, may indicate a respective arrangement order of elements of an m-element set (e.g., a respective arrangement order of the messages $b_j$).

In some embodiments, the pre-processing phase 202 may accordingly include permutation selection 210. During the permutation selection 210, each of the servers 102-$i$ may select a corresponding permutation $p_i$. In some embodiments, selection of the permutations $p_i$ may include selecting a random permutation from all of the different possible m-element permutations in which the selected permutation indicates a respective arrangement order of the m-element set.

In these or other embodiments, the pre-processing phase 202 may include permutation sharing 214. During the permutation sharing 214, each server 102-$i$ may secret share its corresponding permutation $p_i$ with the other servers 102. For example, each other server 102 may be provided with a different permutation share of the respective permutation $p_i$. In some embodiments, the secret sharing may be based on any applicable secret sharing scheme.

In these or other embodiments, the permutation sharing 214 may include each server 102-$n$ publicly posting a commitment for its respective permutation $p_i$. As such, the posting of the permutation commitments may prevent one of the servers 102-$i$ from operating in a malicious manner through changing its respective permutation $p_i$ while also helping maintain confidentiality of its respective permutation $p_i$. In some embodiments, the permutation commitments may be posted using a public message board.

Further, as part of the preliminary verification phase 204, an unmasking key r may be used to reverse the masking generated with the masking keys $u_i$. The unmasking key r may be an m-element long vector that may be based on the masking keys $u_i$ and the permutations $p_i$.

In some embodiments, the pre-processing phase 202 may include unmasking key generation 216. During the unmasking key generation 216, a threshold number x of the servers 102 (e.g., a threshold number according to the secret sharing scheme used to share the masking keys and permutations) may perform a multiparty computation to generate the unmasking key r.

For example, the x servers 102 may obtain each masking key $u_i$ and each permutation $p_i$ using their respective masking key and permutation shares according to the applicable secret share scheme. Further, the x servers 102 may perform multiparty computation to generate the unmasking key r based on the obtained masking keys and permutations. The multiparty computation may include any suitable multiparty computation scheme in which no one server 102 that is participating in the computation is able to obtain the full unmasking key r. The generation of the masking key may be based on an inverse of the schemes used to generate the masking keys and the permutations.

For example, the unmasking key r may be obtained by performing the following operations:

$$<<r>> \leftarrow (0^l)^m$$

For $i \in [n,1]$;

$$<<r>> \leftarrow \text{Permute}(<<p_{i-1}^{-1}>>, <<r+u_i>>)$$

In these or other embodiments, the pre-processing phase 202 may include unmasking key sharing 218. During the unmasking key sharing 218, the x servers that generated the unmasking key r may secret share the unmasking key r with all of servers 102. For example, each server 102 may be provided with a different unmasking key share $r_i$ of the unmasking key r. In some embodiments, the secret sharing may be based on any applicable secret sharing scheme.

In these or other embodiments, the unmasking key sharing 218 may include the x servers 102 posting a commitment for the unmasking key r. In some embodiments, the unmasking key commitment may be posted using a public message board.

As indicated above, the parameters that may be set during the pre-processing phase 202 may be used in the preliminary verification phase 204. In general, the preliminary verification phase 204 may be used to determine whether any of the servers are operating in a malicious manner with respect to management of the AMB 104. Further, the operations described with respect to the preliminary verification phase 204 may be performed once a total number of m messages have been received over a certain period of time. In other words, once m messages have been received, the operations of the preliminary verification phase 204 may be performed. The operations of the preliminary verification phase 204 may then be performed again after another m messages have been received, etc.

The preliminary verification phase 204 may include message reception 220. During message reception 220, the servers 102 may receive m messages $b_j$ from the clients 106. In some embodiments and as indicated above, the messages $b_j$ may be sent using a secret share protocol such that each server 102-$i$ may receive a message share $b_{i,j}$ from a respective client 106-$j$. The message reception 220 may continue until m messages have been provided to the servers 102 such that each server 102-$i$ may receive m different message shares $b_{i,j}$.

The preliminary verification phase 204 may also include message hash generation 222. During message hash generation 222, each server 102-$i$ may generate a respective aggregate hash share $\text{sign}_i$ based on the respective message shares $b_{i,j}$ received by the respective server 102-$i$. For example, in some embodiments, each respective server 102-$i$ may generate a share hash (e.g., using any suitable hashing scheme) of each message share $b_{i,j}$ received by the respective server 102-$i$. Additionally or alternatively, each respective server 102-$i$ may combine the share hashes generated by the respective server 102-$i$ to generate its corresponding aggregate hash share $\text{sign}_i$. For example, in some embodiments, the share hashes may be summed together to obtain the corresponding aggregate hash share $\text{sign}_i$. The above is merely an example of obtaining the aggregate hash shares $\text{sign}_i$, but any suitable manner in generating a hash based on a combination of the respective message shares $b_{i,j}$ received by the respective servers 102-$i$ may be used to obtain the aggregate hash shares $sign_i$. By way of example, in some embodiments, each respective aggregate hash share $sign_i$ may be obtained by each server 102 performing the following operations:

For $i \in [1,m]$ servers compute:

$<<H(b_i)>> \leftarrow Has(<<b_i>>)$ $<<sign>> \leftarrow F(\Sigma_{i=1}^{m}(<<H(b_i)>>))$ In these or other embodiments, each of the respective servers 102-$i$ may publicly post a commitment of its respective aggregate hash share $sign_i$. In these or other embodiments, the servers 102 may post the commitments using a public message board.

In these or other embodiments, the preliminary verification phase 204 may include unmasking vector generation 224. During unmasking vector generation 224, each respective server 102-$i$ may generate an unmasking vector share $rb_i$ based on its respectively received unmasking key share $r_i$ and based on its received message shares $b_{i,j}$. For example, each unmasking key share $r_i$ may be an m-element long vector and each respective server 102-$i$ may receive m different message shares $b_{i,j}$. To generate its respective unmasking vector share $rb_i$, the respective server 102-$i$ may combine (e.g., add) an element j of its respective unmasking key share $r_i$ with a corresponding received message share $b_{i,j}$. For example, the server 102-1 may receive message shares $b_{1,1}$, $b_{1,2}$, ... $b_{1,m}$ and may also receive unmasking key share $r_1$ that may include elements $[r_{1,1}, r_{1,2}, \ldots r_{1,m}]$. The server 102-1 may generate the unmasking vector share $rb_1$ by creating the following vector $[(r_{1,1}+b_{1,1}), (r_{1,2}+b_{1,2}), \ldots (r_{1,m}+b_{1,m})]$ in which the resulting elements may be indicated as follows: $[r_1b_1, r_1b_2, \ldots r_1b_m]$.

The preliminary verification phase 204 may include unmasking vector sharing 226. As detailed further, the preliminary verification phase 204 may include the generation of different iterations of a verification vector in a sequential based procedure in which one server 102 generates a respective iteration of the verification vector and then another server generates a new iteration based on the previous iteration in a one-by-one, sequential fashion. The order of which servers generate which iteration may be determined beforehand (e.g., in the pre-processing phase 202). In these or other embodiments, the first verification vector iteration may be generated based on the unmasking vector shares $rb_i$.

As such, in some embodiments, during the unmasking vector sharing 226 the servers 102 that are not designated to generate the first verification vector iteration may share their respective unmasking vector shares $rb_i$ with the server 102 that is designated to generate the first verification vector iteration. For purposes of explanation, the server 102-1 may be used as an example of the server 102 that is designated to generate the first verification vector iteration.

The preliminary verification phase 204 may also include verification vector generation 228. During verification vector generation 228, the server 102-1 may generate a first verification vector iteration $v_1$ ("iteration $v_1$") of a verification vector. In these or other embodiments, the server 102-1 may generate the iteration $v_1$ based on the unmasking vector shares $rb_i$. For example, the server 102-1 may use the values of the unmasking vector shares $rb_i$ to obtain an m-element long unmasking vector rb. For instance, using the element $r_1b_1$ of the unmasking vector share $rb_1$, the element $r_2b_1$ of the unmasking vector share $rb_2$, and so forth until obtaining all the elements $r_ib_1$ from all of the unmasking vector shares $rb_i$'s (where i is from 1 to n), the server 102-1 may obtain the first element of the unmasking vector rb. The server 102-1 may perform similar operations with respect to obtaining all of the other m−1 elements of the unmasking vector rb.

In these or other embodiments, the server 102-1 may then generate $v_1$ based on the unmasking vector rb, the permutation $p_1$ that corresponds to the server 102-1, and the masking vector $u_1$ that also corresponds to the server 102-1. For example, the server 102-1 may generate $v_1$ according to the following expression (1):

$$v_1 = p_1(rb + u_1) \qquad (1)$$

Additionally or alternatively, the sever 102-1 may publicly post a commitment of $v_1$. In these or other embodiments, the server 102-1 may post the commitment using a public message board.

The verification vector generation 228 may include each of the remaining servers 102-1 generating a respective verification vector iteration $v_i$ in a sequential manner according to the predetermined order and the previously determined verification vector iteration $v_{i-1}$. For example, the server 102-2 may receive the first verification vector iteration $v_1$ and may generate a second verification vector iteration $v_2$ based on $v_1$, the permutation $p_2$ that corresponds to the server 102-2, and the masking vector $u_2$ that also corresponds to the server 102-2. The server 102-3 may then receive the second verification vector iteration $v_2$ and may generate a third verification vector iteration $v_3$ based on $v_2$, the permutation $p_3$ that corresponds to the server 102-3, and the masking vector $u_3$ that also corresponds to the server 102-3, and so forth until the server 102-$n$ receives the n−1 verification vector iteration $v_{n-1}$ and generates an $n^{th}$ verification vector iteration $v_n$ based on $v_{n-1}$, the permutation $p_n$ that corresponds to the server 102-$n$, and the masking vector $u_n$ that also corresponds to the server 102-$n$. By way of example, each of the other servers 102-$i$ may generate its respective $i^{th}$ verification vector $v_i$ according to the following expression (2):

$$v_i = p_i(v_{i-1} + u_i) \qquad (2)$$

Note that expressions (1) and (2) are virtually identical except that the unmasking vector rb of expression (1) has been replaced with the previous verification vector iteration $v_{i-1}$ in expression (2). As such, in some instances, expressions (1) and (2) may be considered to be the same in which the unmasking vector rb is considered to be an initialization verification vector iteration $v_0$.

Additionally or alternatively, each sever 102-$i$ may publicly post a commitment of its respectively determined verification vector iteration $v_i$. In these or other embodiments, the servers 102 may post the commitments using a public message board.

The preliminary verification 204 may also include a verification hash generation 230 in some embodiments. For example, after the server 102-$n$ generates the $n^{th}$ verification vector iteration $v_n$, the server 102-$n$ may generate a verification hash sign' of the verification vector iteration $v_n$. In these or other embodiments, the verification hash sign' may be generated using the same hash function used by the respective servers 102-$i$ to generate their respective aggregate hash shares $sign_i$.

In these or other embodiments, the preliminary verification phase 204 may include a preliminary server verification 232. The preliminary server verification 232 may be based on the verification hash sign' and the respective aggregate hash shares sign$_i$. For example, the verification hash sign' may be a vector that includes hash values for each of the verification vector iteration $v_n$. In these or other embodiments, each of the aggregate hash shares sign$_i$ may be compared against a corresponding hash of the verification hash sign' to determine whether the verification hash sign' is equal to the collection of aggregate hash shares sign$_i$.

In response to a determination that the verification hash sign' is equal to the aggregate hash shares sign$_i$, it may be determined in the preliminary server verification 232 that all of the servers 102 are operating in a trustworthy manner. Additionally or alternatively, in response to a determination that the verification hash sign' is not equal to the aggregate hash shares sign$_i$, it may be determined in the preliminary server verification 232 that at least one of of the servers 102 is not operating in a trustworthy manner.

In instances in which it is determined that all of the servers 102 are operating in a trustworthy manner, the process 200 may not include any more operations until another set of message shares are received for the next time interval, such as at another iteration of the message reception 220 for the next time interval. Additionally or alternatively, in response to a determination that at least one of the servers 102 is not operating in a trustworthy manner, the process 200 may proceed to a full verification phase 206.

In general, the full verification phase 206 may be performed to determine which server 102 may be operating in a malicious manner. In some embodiments, the full verification phase 206 may include a verification vector calculation verification 234 ("vector verification 234"). In general, as part of the determination as to which server 102 may be operating in a malicious manner, a proof may be performed to verify that the respective computations made by each server 102-$i$ during the verification vector generation 228 to generate its respective vector iteration $v_i$ were correct and proper. In particular, given each of the respective commitments $u_i$, $v_i$, $p_i$, and $v_i$, it is verified whether each respective server 102-$i$ properly computed its respective vector iteration $v_i$ according to expression (2) discussed above and repeated below:

$$v_i = p_i(v_{i-1} + u_i) \quad (2)$$

In these and other embodiments, during the vector verification 234, each of the other servers 102 may perform the verification operations with respect to any particular server 102. In some embodiments, the verification may be performed by picking a randomness from a finite abelian group and/or by verifying the consistency of the commitments provided by the server 102 that is being verified. Further, it is noted that such a commitment scheme may be additively homomorphic, which may allow for use of only a zero knowledge proof protocol to check whether the commitments are consistent for an input vector (e.g., $v_{i-1}$ and $u_i$) an output vector (e.g., $v_i$), and a given permutation (e.g., $p_i$).

The full verification phase 206 may include maliciously behaving server identification 236 ("malicious server identification 236") in some embodiments. The malicious server identification 236 may be based on the vector verification 234. For example, in response to the vector verification failing for any particular sever 102-$i$, it may be determined that the particular server 102-$i$ is operating in a malicious manner. Additionally or alternatively, in response to every vector verification passing, it may be determined that the server 102-$n$ is operating in a malicious manner. In these or other embodiments, the servers identified as operating in a malicious manner may be removed and/or replaced.

Modifications, additions, or omissions may be made to the process 200 without departing from the scope of the present disclosure. For example, one or more of the operations performed may be implemented in differing order than explained. Furthermore, the outlined operations are provided only as examples, and some of the operations may be optional, combined into fewer operations, or expanded into additional operations without detracting from the essence of the embodiments.

Figure 3:
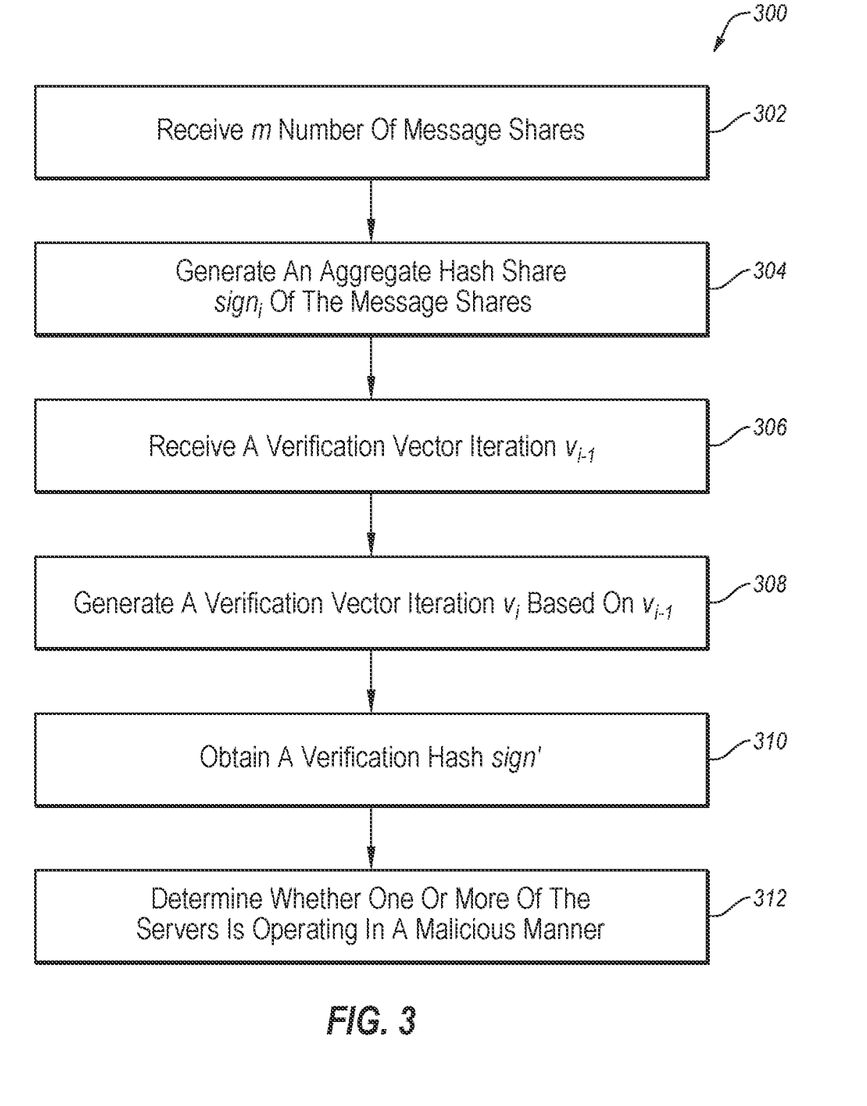
FIG. 3 is a flowchart illustrating a method of verifying servers that manage an anonymous message board.

FIG. 3 is a flowchart illustrating a method 300 of verifying servers that manage an anonymous message board. Each of the operations of method 300 may be performed by one or more of n servers individually and/or collectively, such as the servers 102 of FIG. 1. Further, one or more of the operations of the method 300 may be performed with respect to the process 200.

The method 300 may include a block 302. At block 302 a server $s_i$ of n number of servers may receive m number of message shares. Each respective message share $b_{i,j}$ may correspond to a portion of a message provided by a respective client device of a plurality of client devices. For example, the operations of block 302 may be included in the message reception 220 of the preliminary verification 204 of the process 200.

At block 304, the server $s_i$ may generate an aggregate hash share sign$_i$ of the message shares. In these or other embodiments, the server $s_i$ may generate the aggregate hash share sign$_i$ such as described above with respect to the message hash generation 224 of the preliminary verification 204 of the process 200.

At block 306, the server $s_i$ may receive a verification vector iteration $v_{i-1}$ from a server $s_{i-1}$ of the servers. In these or other embodiments, the server $s_i$ may receive the verification vector iteration $v_{i-1}$ such as described above with respect to the verification vector generation 228 of the preliminary verification 204 of the process 200.

For example, in these or other embodiments, the verification vector iteration $v_{i-1}$ received from the server $s_{i-1}$ may be based on an unmasking vector rb compiled by a server $s_1$ of the servers, in which the unmasking vector rb is based on an unmasking vector share $rb_i$ that is generated by the server $s_i$ based on the message shares received at block 302. Further, the verification vector iteration $v_{i-1}$ received from the server $s_{i-1}$ may be based on respective permutations $p_1$ through $p_{i-1}$ of servers $s_1$ through $s_{i-1}$ of the servers, the permutations $p_1$ through $p_{i-1}$ each indicating a respective arrangement order of elements of an m-element set. Additionally or alternatively, the verification vector iteration $v_{i-1}$ received from the server $s_{i-1}$ may be based on respective masking vectors $u_1$ through $u_{i-1}$ of servers $s_1$ through $s_{i-1}$ of the servers.

At block 308, the server $s_i$ may generate a verification vector iteration $v_i$. In these or other embodiments, the server $s_i$ may generate the verification vector iteration $v_i$ such as described above with respect to the verification vector generation 228 of the preliminary verification 204 of the process 200.

For example, in some embodiments, the server $s_i$ may generate the verification vector iteration $v_i$ based on the verification vector iteration $v_{i-1}$ a permutation $p_i$ that corresponds to the server $s_i$ and that indicates a particular arrangement order of elements of the m-element set, and based on a masking vector $u_i$ that corresponds to the server $s_i$, such as described above.

At block 310, a verification hash sign' that is based on the verification vector $v_i$ may be obtained. In some embodiments, the verification hash sign' may be obtained such as described above with respect to the verification hash generation 230 of the preliminary verification 204 of the process 200.

At block 312, it may be determined whether one or more of the servers is operating in a malicious manner based on the verification hash sign' and the aggregate hash share $sign_i$. In some embodiments, the determination may be made such as described above with respect to the preliminary server verification 232 of the preliminary verification 204 of the process 200.

Modifications, additions, or omissions may be made to the method 300 without departing from the scope of the present disclosure. For example, one skilled in the art will appreciate that the functions and/or operations described with respect to the method 300 may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. In some embodiments, the method 300 may include additional blocks or fewer blocks.

For example, in some embodiments, the method 300 may include one or more of the operations of the pre-procession 202 of the process 200 described above. In these or other embodiments, the method 300 may include one or more of the operations of the full verification 206 of the process 200.

Figure 4:
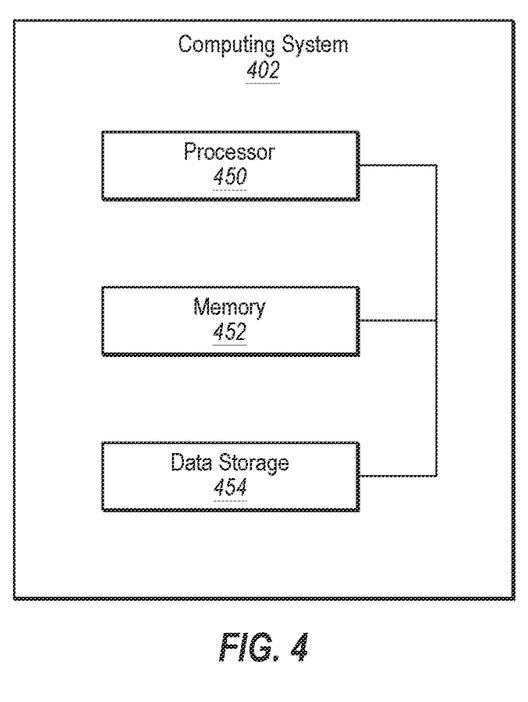
FIG. 4 illustrates a block diagram of an example computing system that may be used to verify servers that manage an anonymous message board.

FIG. 4 illustrates a block diagram of an example computing system 402 that may be used to verify servers that manage an anonymous message board, according to at least one embodiment of the present disclosure. The computing system 402 may be configured to implement or direct one or more operations associated with the system 100 of FIG. 1, the process 200 of FIG. 2, and/or the method 300 of FIG. 3. For example, each of one or more of the servers described in the present disclosure may include the computing system 402, which may cause the respective servers to perform the operations described therewith in the present disclosure.

The computing system 402 may include a processor 450, a memory 452, and a data storage 454. The processor 450, the memory 452, and the data storage 454 may be communicatively coupled.

In general, the processor 450 may include any suitable computer, computing entity, or processing device including various computer hardware or software modules and may be configured to execute instructions stored on any applicable computer-readable storage media. For example, the processor 450 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 4, the processor 450 may include any number of processors configured to, individually or collectively, perform or direct performance of any number of operations described in the present disclosure. Additionally, one or more of the processors may be present on one or more different electronic devices, such as different servers.

In some embodiments, the processor 450 may be configured to interpret and/or execute program instructions and/or process data stored in the memory 452, the data storage 454, or the memory 452 and the data storage 454. In some embodiments, the processor 450 may fetch program instructions from the data storage 454 and load the program instructions in the memory 452. After the program instructions are loaded into memory 452, the processor 450 may execute the program instructions.

The memory 452 and the data storage 454 may include computer-readable storage media for carrying or having computer-executable instructions or data structures stored thereon. Such computer-readable storage media may include any available media that may be accessed by a computer, such as the processor 250. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store particular program code in the form of computer-executable instructions or data structures and which may be accessed by a computer. Combinations of the above may also be included within the scope of computer-readable storage media. Computer-executable instructions may include, for example, instructions and data configured to cause the processor 450 to perform a certain operation or group of operations.

Modifications, additions, or omissions may be made to the computing system 402 without departing from the scope of the present disclosure. For example, in some embodiments, the computing system 402 may include any number of other components that may not be explicitly illustrated or described.

As indicated above, the embodiments described herein may include the use of a computing system including various computer hardware or software modules, as discussed in greater detail below. Further, as indicated above, embodiments described herein may be implemented using computer-readable media for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first, "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the scope of the present disclosure.

What is claimed is:

1. A method of facilitating an anonymous message board, the method comprising:

receiving, by a server $s_i$ of a group of servers that manages the anonymous message board and that includes n number of servers, a group of message shares that includes m number of message shares, each respective message share $b_{i,j}$ corresponding to a portion of a message provided by a respective client device of a plurality of client devices, "i" being an integer between "2" and n and "j" being an integer between "2" and m;

generating, by the server $s_i$, an aggregate hash share $sign_i$ of the message shares;

receiving, by the server $s_i$, a verification vector iteration $v_{i-1}$ from a server $s_{i-1}$ of the servers;

generating, by the server $s_i$, a verification vector iteration $v_i$ based on:
  the verification vector iteration $v_{i-1}$;
  a permutation $p_i$ that corresponds to the server $s_i$ and that indicates a particular arrangement order of elements of an m-element set; and
  a masking vector $u_i$ that corresponds to the server $s_i$;

obtaining a verification hash sign' that is based on the verification vector iteration $v_i$;

participating, with one or more other servers of the servers, in a multiparty computation to determine an aggregate hash sign, the aggregate hash sign being determined based on the aggregate hash share $sign_i$;

determining, as part of the multiparty computation, whether one or more of the servers of the group of servers is operating in an adverse manner based on whether the verification hash sign' is equal to the aggregate hash sign; and removing a particular server from group of servers in response to determining that the particular server is operating in an adverse manner.

2. The method of claim 1, further comprising:
generating, by the server $s_i$, the masking vector $u_i$;
selecting the permutation $p_i$; and
obtaining an unmasking share $r_i$.

3. The method of claim 1, further comprising determining that one or more of the servers is operating in the adverse manner based on the verification hash sign' not being equal to the aggregate hash sign.

4. The method of claim 3, further comprising participating in an additional verification protocol to identify which of the servers is operating in the adverse manner in response to determining that one or more of the servers is operating in the adverse manner.

5. The method of claim 4, wherein participating in the additional verification protocol includes:
verifying that respective verification vector calculations performed by each other server of the servers is accurate, the verifying being based on respective commitments of each respective other server of the other servers of the respective verification vector calculations.

6. The method of claim 1, further comprising generating an unmasking vector share $rb_i$ based on an application to the message shares of an unmasking key share $r_i$ of an unmasking key r that includes m number of unmasking elements.

7. The method of claim 1, further comprising:
generating, by the server $s_i$, an unmasking vector share $rb_i$ based on the message shares; and
providing, by the server $s_i$, the unmasking vector share $rb_i$ to a server $s_1$ of the servers, wherein the verification vector iteration $v_{i-1}$ received from the server $s_{i-1}$ is based on:

an unmasking vector rb compiled by the server $s_1$, the unmasking vector rb being based on the unmasking vector share $rb_i$;

respective permutations $p_1$ through $p_{i-1}$ of servers $s_1$ through $s_{i-1}$ of the servers, the permutations $p_1$ through $p_{i-1}$ each indicating a respective arrangement order of elements of the m-element set; and respective masking vectors $u_1$ through $u_{i-1}$ of servers $s_1$ through $s_{i-1}$ of the servers.

8. One or more non-transitory computer-readable media having instructions stored thereon that, in response to being executed by one or more processors, cause a system to perform operations, the operations comprising:

receiving, by a server $s_i$ of a group of servers that manages the anonymous message board and that includes n number of servers, a group of message shares that includes m number of message shares, each respective message share $b_{i,j}$ corresponding to a portion of a message provided by a respective client device of a plurality of client devices, "i" being an integer between "2" and n and "j" being an integer between "2" and m;

generating, by the server $s_i$, an aggregate hash share $sign_i$ of the message shares;

receiving, by the server $s_i$, a verification vector iteration $v_{i-1}$ from a server $s_{i-1}$ of the servers;

generating, by the server $s_i$, a verification vector iteration $v_i$ based on:

the verification vector iteration $v_{i-1}$;

a permutation $p_i$ that corresponds to the server $s_i$ and that indicates a particular arrangement order of elements of an m-element set; and a masking vector $u_i$ that corresponds to the server $s_i$;

obtaining a verification hash sign' that is based on the verification vector iteration $v_i$;

participating, with one or more other servers of the servers, in a multiparty computation to determine an aggregate hash sign, the aggregate hash sign being determined based on the aggregate hash share $sign_i$;

determining, as part of the multiparty computation, whether one or more of the servers of the group of servers is operating in an adverse manner based on whether the verification hash sign' is equal to the aggregate hash sign; and removing a particular server from group of servers in response to determining that the particular server is operating in an adverse manner.

9. The one or more non-transitory computer-readable media of claim 8, the operations further comprising:

generating, by the server $s_i$, the masking vector $u_i$;

selecting the permutation $p_i$; and obtaining an unmasking share $r_i$.

10. The one or more non-transitory computer-readable media of claim 8, the operations further comprising determining that one or more of the servers is operating in the adverse manner based on the verification hash sign' not being equal to the aggregate hash sign.

11. The one or more non-transitory computer-readable media of claim 10, the operations further comprising participating in an additional verification protocol to identify which of the servers is operating in the adverse manner in response to determining that one or more of the servers is operating in the adverse manner.

12. The one or more non-transitory computer-readable media of claim 11, wherein participating in the additional verification protocol includes:

verifying that respective verification vector calculations performed by each other server of the servers is accurate, the verifying being based on respective commitments of each respective other server of the other servers of the respective verification vector calculations.

13. The one or more non-transitory computer-readable media of claim 8, the operations further comprising generating an unmasking vector share $rb_i$ based on an application to the message shares of an unmasking key share $r_i$ of an unmasking key r that includes m number of unmasking elements.

14. The one or more non-transitory computer-readable media of claim 8, the operations further comprising:

generating, by the server $s_i$, an unmasking vector share $rb_i$ based on the message shares; and providing, by the server $s_i$, the unmasking vector share $rb_i$ to a server $s_1$ of the servers, wherein the verification vector iteration $v_{i-1}$ received from the server $s_{i-1}$ is based on:

an unmasking vector rb compiled by the server $s_1$, the unmasking vector rb being based on the unmasking vector share $rb_i$;

respective permutations $p_1$ through $p_{i-1}$ of servers $s_1$ through $s_{i-1}$ of the servers, the permutations $p_1$ through $p_{i-1}$ each indicating a respective arrangement order of elements of the m-element set; and respective masking vectors $u_1$ through $u_{i-1}$ of servers $s_1$ through $s_{i-1}$ of the servers.

15. A system comprising:

one or more processors; and one or more non-transitory computer-readable media having instructions stored thereon that, in response to being executed by one or more processors, cause a system to perform operations, the operations comprising:

receiving, by a server $f_i$ of a group of servers that manages the anonymous message board and that includes n number of servers, a group of message shares that includes m number of message shares, each respective message share $b_{i,j}$ corresponding to a portion of a message provided by a respective client device of a plurality of client devices, "i" being an integer between "2" and n and "j" being an integer between "2" and m;

generating, by the server $s_i$, an aggregate hash share $sign_i$ of the message shares;

receiving, by the server $s_i$, a verification vector iteration $v_{i-1}$ from a server $s_{i-1}$ of the servers;

generating, by the server $s_i$, a verification vector iteration $v_i$ based on:

the verification vector iteration $v_{i-1}$;

a permutation $p_i$ that corresponds to the server $s_i$ and that indicates a particular arrangement order of elements of an m-element set; and a masking vector $u_i$ that corresponds to the server $s_i$;

obtaining a verification hash sign' that is based on the verification vector iteration $v_i$;

participating, with one or more other servers of the servers, in a multiparty computation to determine an aggregate hash sign, the aggregate hash sign being determined based on the aggregate hash share $sign_i$;

determining, as part of the multiparty computation, whether one or more of the servers of the group of servers is operating in an adverse manner based on whether the verification hash sign' is equal to the aggregate hash sign; and removing a particular server from group of servers in response to determining that the particular server is operating in an adverse manner.

16. The system of claim 15, the operations further comprising:
generating, by the server $s_i$, the masking vector $u_i$;
selecting the permutation $p_i$; and
obtaining an unmasking share $r_i$.

17. The system of claim 15, the operations further comprising determining that one or more of the servers is operating in the adverse manner based on the verification hash sign' not being equal to the aggregate hash sign.

18. The system of claim 17, the operations further comprising participating in an additional verification protocol to identify which of the servers is operating in the adverse manner in response to determining that one or more of the servers is operating in the adverse manner.

19. The system of claim 15, the operations further comprising generating an unmasking vector share $rb_i$ based on an application to the message shares of an unmasking key share n of an unmasking key r that includes m number of unmasking elements.

20. The system of claim 15, the operations further comprising:
generating, by the server $s_i$, an unmasking vector share $rb_i$ based on the message shares; and
providing, by the server $s_i$, the unmasking vector share $rb_i$ to a server $s_1$ of the servers, wherein the verification vector iteration $v_{i-1}$ received from the server $s_{i-1}$ is based on:
an unmasking vector rb compiled by the server $s_1$, the unmasking vector rb being based on the unmasking vector share $rb_i$;
respective permutations $p_1$ through $p_{i-1}$ of servers $s_1$ through $s_{i-1}$ of the servers, the permutations $p_1$ through $p_{i-1}$ each indicating a respective arrangement order of elements of the m-element set; and
respective masking vectors $u_1$ through $u_{i-1}$ of servers $s_1$ through $s_{i-1}$ of the servers.

\* \* \* \* \*